United States Patent Office 2,906,713
Patented Sept. 29, 1959

2,906,713
HYDROFORMING CATALYST CONTAINING ZINC OXIDE

Edward A. Hunter and Marnell A. Segura, Baton Rouge, La., assignors to Esso Research and Engineering Company, a corporation of Delaware No Drawing. Application November 30, 1953
Serial No. 395,295

2 Claims. (Cl. 252—453)

This invention relates to improved catalysts and more particularly to the preparation of new alumina base hydroforming catalysts of improved activity characteristics.

It is known that petroleum naphthas can be subjected to a reforming treatment to yield liquid products boiling within the gasoline boiling range and possessing improved octane numbers. A well known and widely used process for upgrading petroleum naphthas is called hydroforming. In hydroforming, the naphtha feed stock is treated at elevated pressures of about 50 to 700 p.s.i.g. and at temperatures of 750–1050° F. in the presence of a solid catalyst and hydrogen or recycle gas rich in hydrogen. A variety of reactions including dehydrogenation, paraffin and naphthene isomerization, cyclization or aromatization, hydrogenation and hydrocracking occur during hydroforming. All these reactions contribute to the production of a motor fuel product of increased value not only because of its higher octane number but also because of its improved cleanliness characteristics due to the elimination of gum-forming unsaturated constituents and the removal of sulfur.

Catalysts that have been used in hydroforming include various metals such as platinum and palladium and oxides and sulfides of group VI metals particularly molybdenum, chromium, vanadium and tungsten. These catalysts are usually supported upon a base or spacing agent preferably on an adsorptive or high surface area alumina-containing composition such as various activated aluminas, alumina gel and the like.

Alumina is undoubtedly the most widely used support for hydroforming catalysts, not only those containing molybdenum oxide or other group VI metal oxides or sulfides as the active catalyst component but also those containing small amounts of platinum or palladium as the active component. Various methods have been proposed and utilized for the preparation of alumina catalyst supports such as the reaction of an aluminum salt to give aluminum hydroxide, by the hydrolysis of an aluminum alcoholate or by heating or calcining alpha alumina trihydrate or beta alumina trihydrate.

It has been observed previously that the catalytic activity of a particular composition will vary considerably depending upon the method used for preparing the composition. Accordingly, the development of catalyst for hydroforming has been empirical in nature and many methods have been suggested and many substances proposed as activators or stabilizers for hydroforming catalysts. In view of the ever increasing demands for larger quantities of higher octane number motor gasolines a great deal of research effort has been expended in order to develop hydroforming catalysts which are capable of giving high yields of high octane gasolines, i.e. which possess high activity and high selectivity characteristics.

It is the object of this invention to provide the art with new hydroforming catalysts.

It is also the object of this invention to provide new hydroforming catalysts having high activity and selectivity characteristics.

It is a further object of this invention to provide new hydroforming catalysts comprising molybdenum oxide upon an aluminous carrier which will give high yields of high octane number products.

These and other objects will appear more clearly from the detailed specification and claims set out below.

It has now been found that group VI metal oxide catalysts supported upon a base or carrier prepared by mixing together aluminum sulfate, sodium aluminate and a relatively small amount of sodium silicate in an aqueous medium maintained at a final pH of between about 9 and 10, filtering the resultant slurry and washing several times and finally spray drying the alumina can be increased in activity without loss in selectivity by incorporating about 1 to 15 wt. percent of zinc oxide in the catalyst composition. The zinc oxide can be incorporated in the catalyst composition at the same time as the group VI metal oxide or the carrier containing the group VI metal oxide distributed thereon can be given an after-treatment in order to incorporate the zinc oxide.

U.S. Patent 2,498,709 proposes to impregnate an activated alumina base with 2.5 to 15 wt. percent zinc oxide and thereafter to calcine the impregnated alumina and, after such calcination to impregnate the thus treated base with molybdenum. In accordance with the present invention, the incorporation of the zinc oxide is effected simultaneously with or subsequently to the incorporation of the group VI metal catalyst component. It has further been found that the effect of zinc oxide upon hydroforming catalysts using the silica-containing alumina support prepared as described above is unique.

A prior application filed in the name of Charles E. Hemminger on October 31, 1951, bearing Serial No. 318,000, now abandoned, for "Improvements in Hydroforming" discloses and claims the method of preparing the catalyst supports which are used in present invention. Essentially the catalyst support is prepared by mixing together aluminum sulfate, sodium aluminate and a relatively small amount of sodium silicate in an aqueous medium. The ingredients are so proportioned as to give a final pH of between 9 and 10 and the mixing is effected at about ordinary room temperature or slightly higher, for example about 80° F. The slurry resulting from this mixture is then heated to about 120° F. and filtered. The filter cake is washed several times, preferably by reslurrying with water and filtering to remove residual water-soluble materials whereupon the washed product is spray dried.

In the preparation of the original slurry, the ratio of alumina derived from sodium aluminate to that derived from aluminum sulfate may vary from about 1 to 5 to as much as 5 to 1, additional acid or alkali being added to the formulation to achieve the desired pH for precipitation. The amount of sodium silicate used should be sufficient to provide about 0.1 to about 5.0 wt. percent silica in the support or catalyst base. If desired, gluconic acid in amounts of 0.05 to 5 wt. percent based upon the total alumina in the reaction mixture may be provided in the original reaction mixture in order to increase the density of the alumina support formed.

The active hydroforming catalyst material may be a group VI metal oxide or sulfide. The catalyst component may be incorporated by any of the conventional methods. For example, the carrier may be impregnated with a solution of a heat decomposable compound of molybdenum such as ammonium molybdate or the carrier may be dry mixed with molybdic oxide and calcined to form the catalyst composition. The amount of group VI metal compound applied will vary somewhat depending upon the particular one used. For example, in the case of molybdenum oxide, the amount may vary from about 5 to 20 wt. percent of the total catalyst with about 10 wt. percent preferred, while in the case of chromium oxide, a higher percentage is generally required, namely from about 10 to 50 wt. percent of the total catalyst.

In accordance with the present invention, about 1 to 15 wt. percent of ZnO based upon the total catalyst composition is incorporated either simultaneously with or subsequent to the addition of the catalytic metal compound. The zinc oxide may preferably be incorporated by adding a zinc compound such as zinc acetate, zinc nitrate, zinc formate, and the like, which may be converted to zinc oxide by heating or calcining or finely divided zinc oxide may be mixed with the catalyst or the catalyst components in slurry or dry form.

The following examples illustrate the present invention.

EXAMPLE I 288 gallons of a 32 wt. percent solution of sodium aluminate (which sodium aluminate contained 8 wt. percent excess caustic) and 6 gallons of a sodium silicate solution ($Na_2O.3.25SiO_2$) having a specific gravity of 1.4 is diluted with 2300 gallons of water. 150 gallons of a 25 wt. percent solution of aluminum sulfate and 176 gallons $H_2SO_4$, specific gravity 1.26, is diluted with 500 gallons of tap water and added to the first solution. Addition is continued until the final pH of the batch is 9.5 and a temperature of about 80° F. is maintained during the preparation. The slurry is heated to about 120° F. and filtered. The filter cake is reslurried with water and filtered several times in order to remove water soluble materials and the alumina is then spray-dried.

EXAMPLE II

A silica-containing alumina prepared as in Example I is heated 16 hours at 650° F. 900 g. (dry basis) of the heated $Al_2O_3$ is thoroughly mixed to form a paste with a solution of 148 g. $Zn(OCOCH_3)_2.2H_2O$ (57.5 g. ZnO), and 122.5 g. $(NH_4)_2MoO_4$ (101.5 g. $MoO_3$), in about 700 cc. water. The mixture is dried at about 250° F., formed in 3/16" x 3/16" cylindrical pellets, and is activated by heating 6 hours at 1400° F. (10% $MoO_3$, 5% ZnO).

EXAMPLE III

A duplicate of the catalyst of Example II was prepared except no zinc acetate was included in the catalyst preparation.

The catalysts prepared in these two examples were tested in a 200 cc. fixed-bed hydroforming unit with a 200–330° F. virgin naphtha. Test conditions were: 900° F., 200 p.s.i.g., 1 v./v. hr. feed rate, and 1500 cubic feet cylinder hydrogen per barrel feed. The hydroforming test data are presented in the following tabulation, and are in terms of standard catalyst correlations obtained in the same fixed-bed hydroforming test units.

Table I

| Example | II | I |
|---|---|---|
| Catalyst Composition, Percent. | 85Al₂O₃—10MoO₃—5ZnO | 90Al₂O₃—10MoO₃ |
| Reference Catalyst | Enjay 51 [1] | Enjay 51 [1] |
| Yields: | | |
| ΔC₅+, vol. percent [2] | −1 | 0 |
| Relative Carbon [3] | 0.5 | 0.7 |
| Relative Gas [3] | 1.0 | 1.1 |
| Relative Activity: [3] | | |
| V./V./Hr | 1.2 | 0.9 |
| W./Hr./W | 1.6 | 1.3 |

[1] The reference catalyst designated as Enjay 51 in this table and elsewhere below is a commercial hydroforming catalyst prepared on washed and dried granules of alumina prepared by the Bayer process by impregnation with ammonium molybdate dried and activated to produce a catalyst comprising 10% $MoO_3$.
[2] Yield for test catalyst minus yield for reference catalyst at same product aniline point.
[3] Value for test catalyst/value for reference catalyst at same product aniline point.

These data indicate clearly the increased activity at essentially the same selectivity which results from the addition of ZnO.

EXAMPLE IV

Alcoa H–42 activated alumina (a commercial active alumina containing about 5 wt. percent $SiO_2$) is impregnated with ammonium molybdate, dried and activated to produce a catalyst comprising 10% $MoO_3$.

EXAMPLE V

Duplicate of Example IV except base also impregnated with zinc acetate to give 5% ZnO on the finished catalyst.

The following tabulation (Table 2) compares the hydroforming characteristics of the catalysts of Examples IV and V tested under identical conditions.

Table 2.—Two-liter isothermal fixed-bed unit

[200–330° F. virgin naphtha, 4 hour cycle, 900° F., 200 p.s.i.g., 1500 c.f. H₂/bbl. feed]

| Example | IV | V | Enjay 51 |
|---|---|---|---|
| Catalyst | MoO₃ | ZnO, MoO₃ | MoO₃ |
| Activity, W./Hr./W. C₅—430° F.: | 1.2 | 1.1 | 0.6 |
| Vol. Percent Yield | 75 | 75 | 81.0 |
| CFR-Res. O.N | 95 | 95 | 94.0 |
| Vol. Percent C₄ | 10.0 | 9.5 | 5.0 |

It may be seen that the addition of ZnO to catalysts on the Alcoa base results in no gain in either activity or selectivity.

EXAMPLE VI

Hydrocarbon solution of aluminum amylate is hydrolyzed with sufficient water to give an aqueous 5% slurry of hydrous alumina. The slurry is impregnated with ammonium molybdate, dried, and activated to produce a catalyst comprising 10% $MoO_3$.

EXAMPLE VII

Duplicate of Example VI, except alumina slurry also impregnated with enough zinc nitrate to give about 5% ZnO in the finished catalyst.

Hydroforming tests on the catalyst, of Examples VI and VII are compared in Table 3.

Table 3.—200-cc. isothermal fixed-bed unit

[200–420° F. virgin naphtha, 12 hr. cycle, 930° F., 200 p.s.i.g., 0.5 v.v.hr. 2 : 1 mol ratio, H₂ : naphtha]

| Example | VI | VII | Enjay 51 |
|---|---|---|---|
| Catalyst | MoO₃ | ZnO,MoO₃ | MoO₃ |
| C₄—430° F. | | | |
| Vol. percent Yield | 75.2 | 72.8 | 86.9 |
| CFR-Res. O.N | 100.3 | 101.8 | 84.3 |
| Reid Vap. Press | 15.3 | 17.3 | 6.3 |

The octane numbers given indicate that some gain in activity is obtained by inclusion of ZnO, but the C₄—430° F. yield and Reid vapor pressure data indicate that a pronounced loss in selectivity also occurs.

EXAMPLE VIII

A sample of Enjay 51 commercial hydroforming catalyst prepared as indicated in Table 1 is impregnated with an aqueous solution of zinc acetate, dried, and activated to give a zinc oxide content of 5%.

Samples of the zinc oxide modified Enjay 51 catalysts are ground, formed into 3/16" by 3/16" cylindrical pellets and activated 6 hours at 1200° F. These catalysts are evaluated in a 200 cc. fixed-bed hydroforming unit, feeding a 200–320° F. virgin petroleum naphtha at 1 v./v./hr., 200 p.s.i.g., 900° F., and 1500 c.f. H₂/bbl. feed. The test data are summarized in Table 4.

Table 4

| Example | Enjay 51 | VII (two tests) | |
|---|---|---|---|
| Catalyst Components | 10% MoO₃ | 10% MoO₃—5% ZnO | |
| Reference Catalyst | Enjay 51 | Enjay 51 | |
| Yields: | | | |
| ΔC₆+, Vol. percent | 0 | 0 | 0 |
| Relative Carbon | 1.0 | 0.6 | 0.5 |
| Relative Gas | 1.0 | 1.1 | 1.0 |
| Relative Activity: | | | |
| W./Hr./W | 1.0 | 0.9 | 0.9 |
| V./V./Hr | 1.0 | 0.9 | 1.0 |

The data show clearly that no improvement results from the inclusion of 5% ZnO in this type of catalyst.

EXAMPLE IX

This is another example illustrating the practice of the present invention. The preparation differs somewhat from Example II. A sample of the catalyst described as Example III is heated 6 hours at 1400° F. The material is then impregnated with an aqueous solution of zinc acetate, dried and heated 6 hours at 1200° F. to give a catalyst comprising 5% ZnO. The catalyst is formed into 3/16" x 3/16" pellets and tested as described in Example VIII. The test data obtained on the catalysts from Examples II, III and IX is tabulated in Table 5.

Table 5

| Example | II | III | IX |
|---|---|---|---|
| Catalyst Components, Wt. percent. | 10% MoO₃—5% ZnO | 10% MoO₃ | 10% MoO₃—5% ZnO |
| Reference Catalyst | Enjay 51 | Enjay 51 | Enjay 51 |
| Yields: | | | |
| ΔC₆+, Vol. percent | −1 | 0 | −1 |
| Relative Carbon | 0.5 | 0.7 | 0.5 |
| Relative Gas | 1.0 | 1.0 | 1.0 |
| Relative Activities: | | | |
| W./Hr./W | 1.6 | 1.3 | 1.6 |
| V./V./Hr | 1.2 | 0.9 | 1.4 |

Both Examples II and IX are found to give a marked increase in activity over the catalyst of Example III which contained the same base or support but which did not contain the zinc oxide. Examples IV-VIII inclusive show that the addition of zinc oxide either does not have any effect upon other similar compositions or has an adverse effect upon the selectivity of the catalyst.

Catalysts prepared in accordance with the present invention may be used to advantage in the hydroforming of petroleum fractions boiling in the motor fuel or naphtha range such as a virgin naphtha, a cracked naphtha, a Fischer-Tropsch naphtha or the like. The feed stock may have a boiling range of from about 125–450° F. or it may be a narrow boiling cut from within this range. The feed stock is ordinarily preheated to about 800–1000° F., preferably about 950° F. before charging to the reaction zone.

Recycle gas, which contains about 50 to 80 volume percent hydrogen, is preheated to about 1050–1200° F., preferably about 1150–1175° F. before introduction into the reaction zone. The recycle gas is circulated through the reaction zone at a rate of from about 1000 to 8000 cu. ft. per barrel of naphtha feed in order to supply heat for the hydroforming reaction and to minimize carbon deposition upon the catalyst.

The hydroforming can be carried out in a fixed or moving bed or preferably in a fluidized solids reactor system in which catalyst is continuously circulated between a reaction zone and regeneration zone. The hydroforming reaction zone is operated at about 850–1050° F., preferably about 900–950° F. and at pressures from about 50–600 lbs. per sq. inch, preferably about 100–250 lbs. per sq. inch. Small amounts of water vapor are present in the reaction zone, due principally to the presence of water in the feed and in the recycle gas and also due to the formation of water in the regeneration of the spent catalyst as well as in the reduction of the regenerated catalyst.

The regeneration of the spent reactor catalyst is effected by burning off carbonaceous deposits at temperatures of about 1050–1200° F. In fluidized solids systems, the regeneration is effected at substantially the same pressure as is maintained in the hydroforming reaction zone in order to facilitate transfer of the catalyst solids between these two zones. In some cases, particularly in fixed bed operation, regeneration at or near atmospheric pressure may offer some advantages in control of temperatures, removal of adsorbed materials, particularly water and sulfur compounds and control of the reduction of the regenerated catalyst. In fluidized solids systems, the average residence time of catalyst in the reactor is of the order of from about 3 to 4 hours while the average residence time of the catalyst in the regenerator is of the order of from about 3 to 15 minutes, although when running certain feed stocks, particularly high sulfur feeds, it may be desirable to increase the holding time of the catalyst in the regenerator to about one hour.

The weight ratio of catalyst to oil introduced into the reactor is from about 0.5 to about 3.5. It is preferred to operate at catalyst to oil ratios of about 1 since higher ratios ordinarily tend to give excessive carbon formation. Space velocity or the weight in pounds of feed charged per hour per pound of catalyst in the reactor depends upon the age or activity level of the catalyst, the character of the feed stock and the desired octane number of the product. It may vary from about 1.5 w./hr./w. to about 0.15 w./hr./w.

The foregoing description contains a limited number of embodiments of the present invention. It will be understood, however, that this invention is not limited thereto since numerous variations are possible without departing from the scope of this invention.

What is claimed is:

1. A hydroforming catalyst composition consisting essentially of from 5 to 20 wt. percent of molybdenum oxide and from 1 to 15 wt. percent zinc oxide distributed upon a support prepared by mixing in an aqueous medium sodium aluminate, aluminum sulfate and sodium silicate, adjusting the pH of the reaction mixture to between 9 and 10, filtering the resulting precipitate, washing the precipitate to remove water soluble materials and spray drying the washed precipitate.

2. The method of preparing a hydroforming catalyst which comprises mixing in an aqueous medium sodium aluminate, aluminum sulfate and sodium silicate, adjusting the pH of the reaction mixture to about 9–10, filtering the resulting precipitate, washing the precipitate to remove water soluble materials, spray drying the washed precipitate and thereafter incorporating first from 10–15 wt. percent of chromium oxide and then from 1–15 wt. percent zinc oxide based on the entire catalyst composition.

References Cited in the file of this patent

UNITED STATES PATENTS

| | | |
|---|---|---|
| 2,398,610 | Bailey et al. | Apr. 16, 1946 |
| 2,435,158 | Read | Jan. 27, 1948 |
| 2,437,532 | Huffman | Mar. 9, 1948 |
| 2,446,799 | Winding | Aug. 10, 1948 |
| 2,508,014 | Davidson | May 16, 1950 |
| 2,548,860 | Bond | Apr. 17, 1951 |
| 2,687,381 | Hendricks et al. | Aug. 24, 1954 |